US010671173B2

(12) United States Patent
Peng et al.

(10) Patent No.: US 10,671,173 B2
(45) Date of Patent: Jun. 2, 2020

(54) GESTURE POSITION CORRECTIING METHOD AND AUGMENTED REALITY DISPLAY DEVICE

(71) Applicant: Lenovo (Beijing) Co., Ltd., Beijing (CN)

(72) Inventors: Fangzhen Peng, Beijing (CN); Jian Deng, Beijing (CN); Gefang Ma, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/023,873

(22) Filed: Jun. 29, 2018

(65) Prior Publication Data
US 2019/0004613 A1 Jan. 3, 2019

(30) Foreign Application Priority Data
Jun. 30, 2017 (CN) .......................... 2017 1 0525263

(51) Int. Cl.
*G06F 3/01* (2006.01)
*G06F 3/0484* (2013.01)
*G06T 19/00* (2011.01)

(52) U.S. Cl.
CPC ............ *G06F 3/017* (2013.01); *G06F 3/0484* (2013.01); *G06F 3/011* (2013.01); *G06T 19/006* (2013.01)

(58) Field of Classification Search
CPC ........ G06F 3/017; G06F 3/0484; G06F 3/011; G06F 2203/012; G06T 19/006
See application file for complete search history.

(56) References Cited

U.S. PATENT DOCUMENTS

| 4,263,719 | A  | * | 4/1981 | Murdoch | ................. F41G 1/12 33/277 |
| 4,852,988 | A  | * | 8/1989 | Velez | ..................... A61B 3/113 351/210 |
| 6,600,475 | B2 | * | 7/2003 | Gutta | .................... G06F 3/0304 345/156 |
| 7,893,920 | B2 | * | 2/2011 | Endoh | ................... G06F 3/0304 345/156 |
| 8,933,882 | B2 | * | 1/2015 | Burachas | ................ G06F 3/012 345/157 |
| 10,070,120 | B2 | * | 9/2018 | Pedley | ................. H04N 13/344 |
| 2005/0094019 | A1 | * | 5/2005 | Grosvenor | ............. G03B 17/00 348/335 |
| 2008/0084472 | A1 | * | 4/2008 | Trudeau | ............... G02B 27/017 348/51 |
| 2009/0110235 | A1 | * | 4/2009 | Marti | ...................... G06F 3/011 382/103 |

(Continued)

FOREIGN PATENT DOCUMENTS

CN 101163236 A 4/2008
CN 104808795 A 7/2015
(Continued)

*Primary Examiner* — Mihir K Rayan
(74) *Attorney, Agent, or Firm* — Anova Law Group, PLLC

(57) ABSTRACT

A gesture position correcting method includes obtaining position information of a gesture performed by a gesture-performing object, calculating a position deviation of the gesture according to a distance and an angle between a depth camera capturing the gesture and a user eye, and correcting the position information according to the position deviation.

14 Claims, 4 Drawing Sheets

(56) References Cited

U.S. PATENT DOCUMENTS

| | | | | |
|---|---|---|---|---|
| 2011/0043616 A1* | 2/2011 | Dobbie | ............... | G02B 27/017 |
| | | | | 348/62 |
| 2012/0120103 A1* | 5/2012 | Border | ................ | G02B 27/017 |
| | | | | 345/633 |
| 2013/0335303 A1* | 12/2013 | Maciocci | ................ | G06F 3/011 |
| | | | | 345/8 |

FOREIGN PATENT DOCUMENTS

| CN | 205080499 U | 3/2016 |
|---|---|---|
| CN | 105929958 A | 9/2016 |

\* cited by examiner

GESTURE POSITION CORRECTIING METHOD AND AUGMENTED REALITY DISPLAY DEVICE

CROSS-REFERENCE TO RELATED APPLICATION

This application claims priority to Chinese Patent Application No. 201710525263.8, filed on Jun. 30, 2017, the entire contents of which are incorporated herein by reference.

TECHNICAL FIELD

The present disclosure generally relates to the field of augmented reality display device and, more particularly, to a gesture position correcting method and an augmented reality display device.

BACKGROUND

Virtual display devices have more and more applications. Generally, during interactions, gestures may be used to control displayed objects or menus. Thus, an accuracy of gesture is relatively important in virtual display.

Currently, in conventional augmented reality devices, tedious gesture detections are used to perform precision calibration. The detection process is relatively inconvenient, has a relatively poor use experience, and has a relatively low calibration accuracy.

SUMMARY

In one aspect, the present disclosure provides a gesture position correcting method. The gesture position correcting method includes obtaining position information of a gesture performed by a gesture-performing object, calculating a position deviation of the gesture according to a distance and an angle between a depth camera capturing the gesture and a user eye, and correcting the position information according to the position deviation.

Another aspect of the present disclosure provides an augmented reality display device including a depth camera and a processor. The depth camera captures a gesture performed by a gesture-performing object. The processor is coupled to the depth camera. The processor obtains position information of the gesture, calculates a position deviation of the gesture according to a distance and an angle between the depth camera and a user eye, and corrects the position information according to the position deviation.

BRIEF DESCRIPTION OF THE FIGURES

The following drawings are merely examples for illustrative purposes according to various disclosed embodiments and are not intended to limit the scope of the present disclosure.

DETAILED DESCRIPTION

Embodiments of the disclosure will now be described in more detail with reference to the drawings. It is to be noted that, the following descriptions of some embodiments are presented herein for purposes of illustration and description only, and are not intended to be exhaustive or to limit the scope of the present disclosure.

The aspects and features of the present disclosure can be understood by those skilled in the art through the embodiments of the present disclosure further described in detail with reference to the accompanying drawings. The term "and/or" used herein includes any suitable combination of one or more related items listed.

Figure 1:
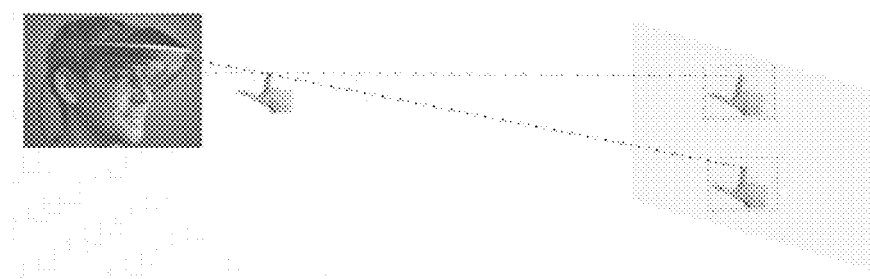
FIG. 1 illustrates a schematic view of a deviation between a position of a gesture detected by a depth camera in a conventional augmented reality display device and a position of the gesture detected by a user eye.

In conventional technologies, as shown in FIG. 1, there is a distance between a depth camera of an augmented reality display device and a user eye. The distance results in a visual deviation when the depth camera and the user eye observe a gesture. The visual deviation may include a lateral deviation (i.e., a deviation in the lateral direction) and a vertical deviation (i.e., a deviation in the vertical direction that is approximately perpendicular to the lateral direction). Accordingly, when the user performs a gesture control, the user may consider that a gesture has moved to a corresponding position, but the depth camera may not consider that the gesture has moved to the corresponding position, thereby causing the gesture operation to be inaccurate. For example, as shown in FIG. 1, there is a vertical position deviation between the gesture observed by the depth camera and that observed by the user eye, e.g., between the gestures observed by the depth camera and the user eye on a projection plane. For example, a gesture, e.g., a projected gesture, in an upper region of the projection plane is perceived by the user eye, and another gesture in a lower region of the projection plane is perceived by the depth camera. A certain distance exists between the projected gesture positioned through the user's eyes and the projected gesture positioned through the depth camera.

The present disclosure provides a gesture position correcting method, which may be implemented in an augmented reality display device. The augmented reality display device may include a depth camera. The method may include obtaining an image through a depth camera and detecting a gesture, including detected position information of the gesture; calculating a position deviation of the gesture according to a distance and an angle between the depth camera and the user eye; and correcting the detected position information of the gesture by using the position deviation, i.e., according to the position deviation.

The present disclosure further provides an augmented reality display device. The augmented reality display device may include a depth camera and a processor. The depth camera may be configured to obtain an image and detect a gesture. The processor may be configured to calculate a position deviation of the gesture according to a distance and an angle between the depth camera and the user eye, and to correct detected position information of the gesture obtained when the gesture is displayed in the augmented display device according to the position deviation.

The embodiments of the present disclosure are described in detail below with reference to the accompanying drawings. The present disclosure provides a gesture position correcting method, which may be implemented in an augmented reality display device. The augmented reality display device may include a depth camera. The method may calculate a deviation between gesture position information detected by the depth camera and gesture position information observed by the user eye, and may have a relatively convenient operation and a relatively high correction accuracy.

Figure 2:
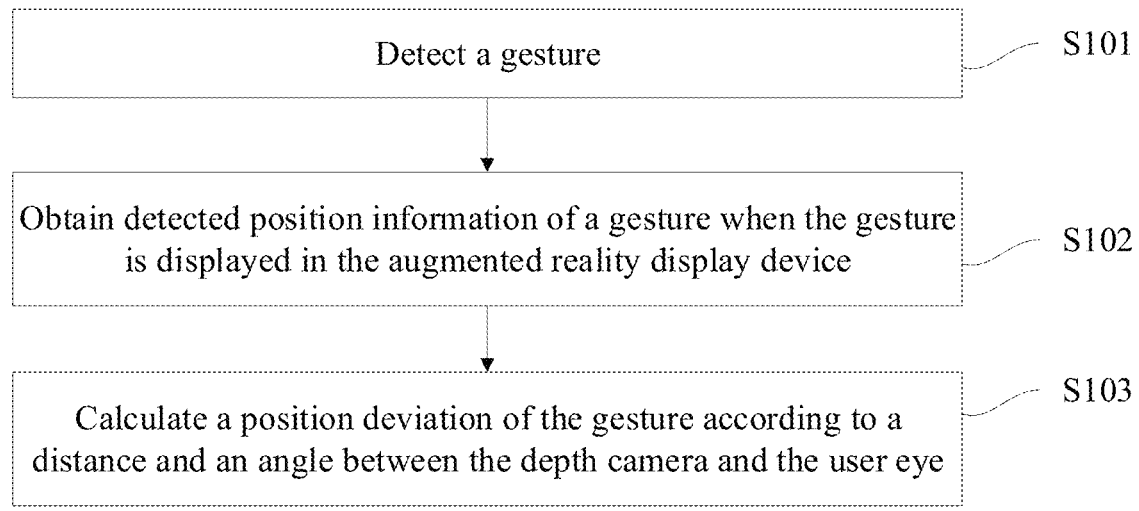
FIG. 2 illustrates a flowchart of an example of gesture position correcting method consistent with disclosed embodiments.

FIG. 2 illustrates a flowchart of an example of gesture position correcting method consistent with disclosed embodiments. With reference to FIG. 2, the gesture position correcting method is described below.

At S101, a gesture is detected.

In some embodiments, the augmented reality display device may be provided with a depth camera and an image recognition circuit. Through the depth camera, image information, e.g., images, may be obtained. The image recognition circuit may perform recognition on an image obtained by the depth camera. For example, the image recognition circuit may recognize a human face. In some embodiments, the image recognition circuit may recognize a gesture operation in images. In addition, the image recognition circuit may include an image recognition circuit integrated in the depth camera, or may include a separate apparatus or circuit that can communicate with the depth camera. Thus, in some embodiments, the depth camera may directly perform image recolonization on image information obtained by the depth camera, such that a gesture in the obtained image may be recognized. In some other embodiments, image information obtained by the depth camera may be sent to an image recognition circuit for gesture recognition to perform gesture detection.

At S102, detected position information of a gesture is obtained when the gesture is displayed in the augmented reality display device.

In some embodiments, the detected position information may include position information of the gesture obtained by the depth camera of the augmented reality display device. A difference between a position of the depth camera and a position of the user eye may result in a certain deviation between gesture position information obtained by the depth camera through analysis, i.e., the detected position information, and gesture position information observed by the user eye, also referred to as "observed position information." In some embodiments, the depth camera may further include an image processing circuit. The image processing circuit may obtain a position of the gesture in the image by analyzing the image information obtained by the depth camera. In some embodiments, in response to detecting the gesture information in the image, the image recognition circuit may send the detected gesture information to the image processing circuit. The image processing circuit may obtain the detected position information of the gesture in the image by analyzing the image. The detected position information may include, for example, a projection position of a hand performing the gesture as detected by the depth camera. The projection position of the hand may be on a projection plane and may be represented by, for example, coordinates of the projection position on the projection plane.

At S103, a position deviation of the gesture is calculated according to a distance and an angle between the depth camera and the user eye. The angle between the depth camera and the user eye may refer to, for example, an angle between a straight line passing through the user eye and the depth camera and a line of sight of the user eye. The line of sight of the user eye may be, for example, along a horizontal direction.

Figure 3:
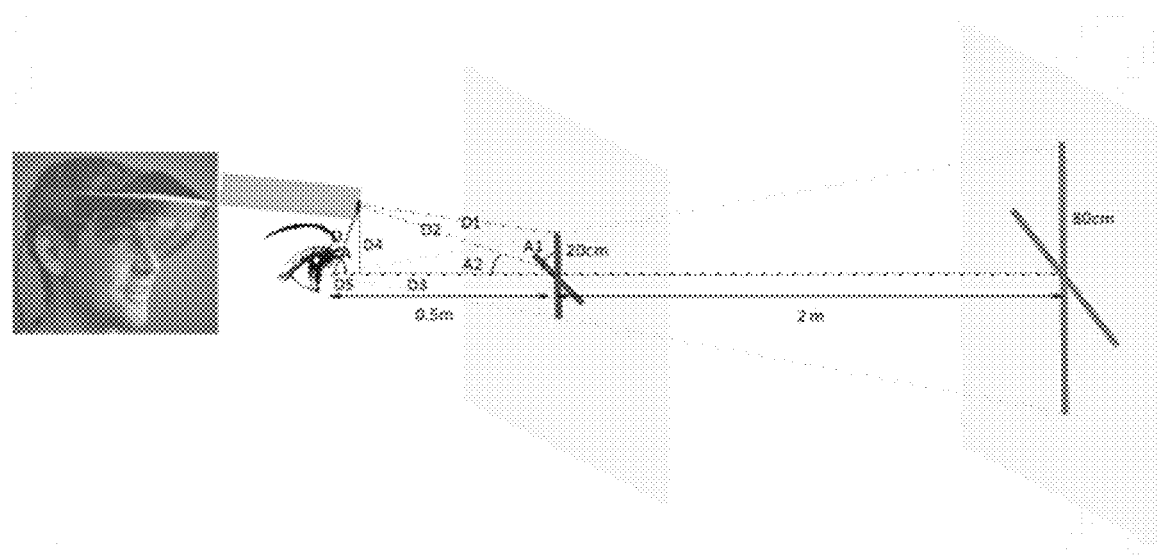
FIG. 3 illustrates a schematic view of an example of gesture position correcting method consistent with disclosed embodiments.

In some embodiments, as shown in FIG. 3, the augmented reality display device can obtain preset parameters by executing a parameter verification program. The parameter verification program may be, for example, executed when the augmented reality display device starts, i.e., executed in response to start-up of the augmented reality display device. For example, the augmented reality display device may prompt the user to input a first cross and a second cross. The first and second crosses may include two crosses that the user inputs through a gesture when the user wears the augmented reality display device, or may include two crosses that are outputted and displayed on the display screen by the augmented reality display device. In some embodiments, the user can adjust positions of the two crosses to make the two crosses coincide with each other as appeared to the user eye. In some other embodiments, the user can adjust a posture of the user to make the two crosses coincide with each other as appeared to the user eye. Sizes of the two crosses and a spacing between the two crosses may be set according to various application scenarios. In some embodiments, the spacing between the two crosses may be, for example, approximately 2 m. A line segment length of the first cross closer to the user may be, for example, approximately 20 cm. A line segment length of the second cross farther away from the user may be, for example, approximately 80 cm. By adjusting a posture of the user and/or a position relationship between the two crosses, the user may make the two crosses overlap with each other from the user's visual angle. After the two crosses overlap with each other, the augmented display device can automatically calculate a distance D between the depth camera and the user eye, as well as an angle A between the depth camera and the user eye. The augmented reality display device may further use the distance D and the angle A to calculate a position deviation of a gesture.

For example, position information of the gesture obtained by the depth camera and position information of the gesture observed by the user eye may have a deviation in a vertical direction. In the example shown in FIG. 3, position relation between the two crosses may be adjusted by the user, such that the user eye may observe that two crosses overlap with each other. Further, a distance between the user eye and the first cross, a distance D1 between the depth camera and an upper end of the first cross, a distance D2 between the depth camera and a center of the first cross, a horizontal distance D3 between the depth camera and the center of the first cross, a vertical distance D4 between the depth camera and the center of the first cross, and a horizontal distance D5 between the depth camera and the user eye may be measured to calculate an angle A1 between a vertical direction and a line connecting the depth camera and the center of the first cross, and an angle A2 between a horizontal direction and the line connecting the depth camera and the center of the first cross. Further, the distance D and the angle A between the depth camera and the user eye may be calculated. The calculation process is described below.

In some embodiments, the user may adjust the position relation between the two crosses, such that the user may observe that the two crosses overlap with each other. When the two crosses overlap, the distance between the user eye and the first cross may be, for example, approximately 0.5 m. Thus, $$A1=\arccos((D2^2+0.2^2-D1^2)/(2*D2*0.2));$$

$$A2=90-A1;$$

$$D4=D2*\sin A2;$$

$$D3=D2*\cos A2; \text{ and}$$

$$D5=0.5-D3.$$

The calculation of angle A is described below.

$$\begin{aligned}A &= \arctan(D4/D5)\\ &= \arctan(D2*\sin(90-\arccos((D2^2+0.2^2-D1^2)/\\ &\quad (2*D2*0.2)))/(0.5-D2*\cos(90-\arccos\\ &\quad ((D2^2+0.2^2-D1^2)/(2*D2*0.2))))).\end{aligned}$$

The calculation of distance D is described below.

$$\begin{aligned}D &= D4/\sin A\\ &= D2*\sin(90-\arccos((D^2+0.2^2-D1^2)/(2*D2*0.2)))/\sin A.\end{aligned}$$

Thus, the distance D between the depth camera and the user eye may be calculated, and the angle A between the depth camera and the user eye may be calculated.

In some embodiments, calculating the position deviation of the gesture by using the distance D and the angle A may include calculating the position deviation of the gesture by using a function model. The function model may include d1=D*C1*sin A/C2, where d1 denotes the position deviation, A denotes the angle between the depth camera and the user eye, D denotes the distance between the depth camera and the user eye, and C1 and C2 are preset parameters.

Figure 4:
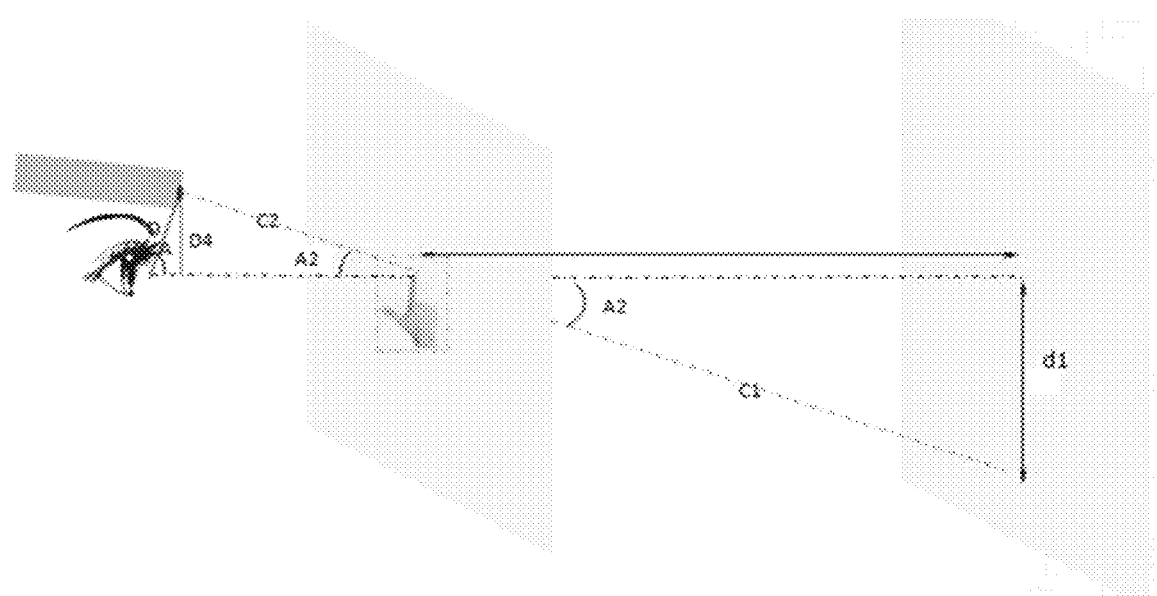
FIG. 4 illustrates a schematic view of another example of gesture position correcting method consistent with disclosed embodiments.

In some embodiments, as shown in FIG. 4, C2 may be, for example, a distance between the depth camera and an object that performs a gesture, referred to as "a gesture-performing object," e.g., a hand that performs a gesture. C1 may be, for example, a distance between the gesture-performing object and an imaging position, i.e., a projection position on the projection plane, of the gesture-performing object obtained by analyzing a gesture image obtained by the depth camera. In some embodiments, C1 and C2 can be obtained through the depth camera and a system, such as the augmented reality display device. In the function model, the distance D between the depth camera and the user eye, as well as the angle A between the depth camera and the user eye, may be known variables obtained through the foregoing calculations. Accordingly, D4=D*sin A, and A2=arcsin(D4/C2)= arcsin(D*sin A/C2). Thus, d1=C1*sin A2=D4*C1/C2=D*C1*sin A/C2.

Through the above-described calculations, a position deviation d1, i.e., an offset amount d1, of the gesture positions detected by the user eye and the depth camera may be obtained. Thus, the augmented reality display device may automatically subtract the position deviation d1 from the coordinate in the vertical direction that has a deviation, such that the position of the gesture in the system under the visual angle of the user may be obtained.

At S104, the detected position information of the gesture is corrected according to the position deviation.

In some embodiments, the above-described calculated position deviation d1 of the gesture positions detected by the user eye and the depth camera may be used to correct a position of the gesture.

In some embodiments, the position deviation d1 may be a position deviation of the gesture in the lateral direction of the first cross and the second cross. In some other embodiments, the position deviation d1 may be a position deviation of the gesture in the vertical direction of the first cross and the second cross.

In the above embodiments, correcting the vertical deviation of the gesture positions detected by the user eye and the depth camera is described. For correcting the lateral deviation of gesture positions detected by the user eye and the depth camera, reference can be made to the above-descriptions for correcting the vertical deviation that are similar, and the description thereof is not repeated here.

Based on the examples described above, the gesture position correcting method may correct the detected position information of the gesture obtained by the depth camera after obtaining the vertical position deviation and the lateral position deviation of the gesture positions, such that a consistency of the gesture positions observed by the depth camera and the user eye may be ensured.

In addition, the present disclosure provides an augmented reality display device. The augmented reality display device may perform a gesture position correcting method consistent with the disclosure, such as one of the above-described gesture position correcting methods.

Figure 5:
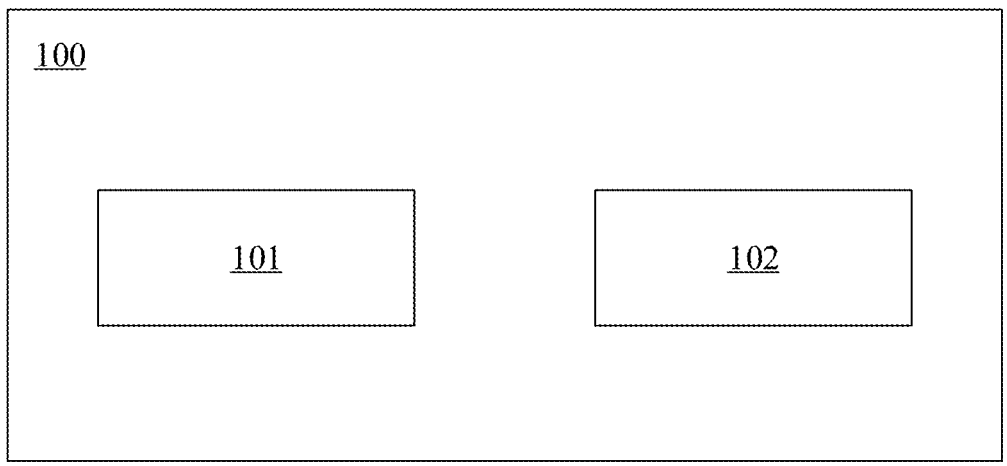
FIG. 5 illustrates a block diagram of an example of augmented reality display device consistent with disclosed embodiments.

FIG. 5 illustrates a block diagram of an example of augmented reality display device. As shown in FIG. 5, the augmented reality display device 100 includes a depth camera 101 and a processor 102. The augmented reality display device 100 may further include a display screen (not shown). The depth camera 101 may obtain an image and detect a gesture. In some embodiments, the depth camera 101 may be integrated with an image recognition function. That is, an image recognition circuit may be integrated in the depth camera. In some other embodiments, the augmented reality display device may include a separate image recognition circuit that communicates with the depth camera. In some embodiments, the depth camera may directly perform image recolonization on image information obtained by the depth camera, such that a gesture in the obtained image may be recognized. In some other embodiments, image information obtained by the depth camera may be sent to the image recognition circuit for gesture recognition to perform gesture detection.

The processor 102 may be coupled with the depth camera 101 and may calculate a position deviation of the gesture based on a distance and an angle between the depth camera 101 and the user eye. Further, the processor 102 may correct detected position information of the gesture obtained when the gesture is displayed in the augmented display device according to the position deviation.

In some embodiments, the processor 102 of the augmented reality display device 100 may be further configured to calculate the position deviation of the gesture by using a function model d1=D*C1*sin A/C2, where d1 denotes the position deviation, A denotes the angle between the depth camera and the user eye, D denotes the distance between the depth camera and the user eye, and C1 and C2 are preset parameters. The calculation method is same as or similar to the above-described examples, and descriptions thereof are not repeated here.

In some embodiments, the processor 102 of the augmented reality display device 100 may be further configured to obtain preset parameters by executing a parameter verification program. Executing the parameter verification program may include outputting and displaying the first cross and the second cross having different distances with respect to the user eye, where the user adjusts a posture to make the first cross and the second cross overlap with each other; obtaining a first distance (C1) between the gesture-performing object and an imaging position, i.e., a projection position on the projection plane, of the gesture-performing object, and a second distance (C2) between the depth camera and the gesture-performing object; and generating preset parameters according to the first distance and the second distance. The process of the processor 102 generating the preset parameters is same as or similar to the above-described embodiments.

For example, the position information of the gesture obtained by the depth camera and the position information of the gesture observed by the user eye may have a deviation in a vertical direction. In some embodiments, position relation between the two crosses may be adjusted by the user, such that the user eye may observe that two crosses overlap with each other. Further, a distance between the user eye and the first cross, a distance D1 between the depth camera and an upper end of the first cross, a distance D2 between the depth camera and a center of the first cross, a horizontal distance D3 between the depth camera and the center of the first cross, a vertical distance D4 between the depth camera and the center of the first cross, and a horizontal distance D5 between the depth camera and the user eye may be measured to calculate an angle A1 between a vertical direction and a line connecting the depth camera and the center of the first cross, and an angle A2 between a horizontal direction and the line connecting the depth camera and the center of the first cross. Further, the distance D and the angle A between the depth camera and the user eye may be calculated. The calculation process is described below.

In some embodiments, the user may adjust the position relation between the two crosses, such that the user may observe that the two crosses overlap with each other. The distance between the user eye and the first cross may be, for example, approximately 0.5 m. Thus, $$A1 = \arccos((D2^2 + 0.2^2 - D1^2)/(2*D2*0.2));$$

$$A2 = 90 - A1;$$

$$D4 = D2 * \sin A2;$$

$$D3 = D2 * \cos A2; \text{ and}$$

$$D5 = 0.5 - D3.$$

The calculation of angle A is described below.

$$\begin{aligned} A &= \arctan(D4/D5) \\ &= \arctan(D2 * \sin(90 - \arccos((D2^2 + 0.2^2 - D1^2)/ \\ &\quad (2*D2*0.2)))/(0.5 - D2 * \cos(90 - \arccos \\ &\quad ((D2^2 + 0.2^2 - D1^2)/(2*D2*0.2))))). \end{aligned}$$

The calculation of distance D is described below.

$$\begin{aligned} D &= D4/\sin A \\ &= D2 * \sin(90 - \arccos((D2^2 + 0.2^2 - D1^2)/(2*D2*0.2)))/\sin A. \end{aligned}$$

Thus, the distance D between the depth camera and the user eye may be calculated, and the angle A between the depth camera and the user eye may be calculated.

In some embodiments, calculating the position deviation of the gesture by using the distance D and the angle A may include calculating the position deviation of the gesture by using a function model. The function model may include $d1 = D*C1*\sin A/C2$, where d1 denotes the position deviation, A denotes the angle between the depth camera and the user eye, D denotes the distance between the depth camera and the user eye, and C1 and C2 are preset parameters.

In some embodiments, as shown in FIG. 4, C2 may be, for example, a distance between the depth camera and an object that performs a gesture, referred to as "a gesture-performing object". C1 may be, for example, a distance between the gesture-performing object and an imaging position of the gesture-performing object obtained by analyzing a gesture image that is obtained by the depth camera. In some embodiments, C1 and C2 can be obtained through the depth camera and a system, such as the augmented reality display device. In the function model, the distance D between the depth camera and the user eye, as well as the angle A between the depth camera and the user eye, may be known variables obtained through the foregoing calculations. Accordingly, $D4 = D*\sin A$, and $A2 = \arcsin(D4/C2) = \arcsin(D*\sin A/C2)$. Thus, $d1 = C1*\sin A2 = D4*C1/C2 = D*C1*\sin A/C2$.

Through the above-described calculation, a position deviation d1, i.e., an offset amount d1, of the gesture positions detected by the user eye and the depth camera may be obtained. Thus, the augmented reality display device may automatically subtract the position deviation d1 from the coordinate in the vertical direction that has a deviation, such that the position of the gesture in the system under the visual angle of the user may be obtained.

In some embodiments, the position deviation d1 may be a position deviation of the gesture in the lateral direction of the first cross and the second cross. In some other embodiments, the position deviation d1 may be a position deviation of the gesture in the vertical direction of the first cross and the second cross.

Based on the examples described above, the augmented reality display device may correct the detected position information of the gesture obtained by the depth camera after obtaining the vertical position deviation and the lateral position deviation of the gesture positions, such that a consistency of the gesture positions observed by the depth camera and the user eye may be ensured.

The gesture position correcting method and the augmented reality display device of the disclosure can correct the position information of the gesture obtained by the depth camera, without a need to perform complicated and repetitive corrective operations, and can improve a user experience.

For details of the electronic device in which the above-described data processing method is implemented, reference can be made to the foregoing descriptions of method embodiments, which are not repeated here.

The present disclosure provides a gesture position correcting method and an augmented reality display device. The gesture position correcting method may be implemented in the augmented reality display device including a depth camera. The method may include detecting a gesture; obtaining detected position information of the gesture when the gesture is displayed in the augmented reality display device; calculating detected position information of the gesture; calculating a position deviation of the gesture based on a distance and an angle between the depth camera and the user eye; and correcting the detected position information of the gesture according to the position deviation. The method can reduce a deviation between position information detected by the depth camera and position information observed by the user eye.

The foregoing description of the embodiments of the disclosure has been presented for purposes of illustration and description. It is not intended to be exhaustive or to limit the disclosure to the precise form or to example embodiments disclosed. Accordingly, the foregoing description should be regarded as illustrative rather than restrictive. Obviously, many modifications and variations will be apparent to persons skilled in this art. The embodiments are chosen and described in order to explain the principles of the technology, with various modifications suitable to the particular use or implementation contemplated. It is intended that the scope of the invention be defined by the claims appended hereto in which all terms are meant in their broadest reasonable sense unless otherwise indicated. Therefore, the term "the disclosure," "the present disclosure," or the like does not necessarily limit the claim scope to a specific embodiment, and the reference to example embodiments of the disclosure does not imply a limitation on the invention, and no such limitation is to be inferred. Moreover, the claims may refer to "first," "second," etc., followed by a noun or element. Such terms should be understood as a nomenclature and should not be construed as giving the limitation on the number of the elements modified by such nomenclature unless specific number has been given. Any advantages and benefits described may or may not apply to all embodiments of the disclosure. It should be appreciated that variations may be made to the embodiments described by persons skilled in the art without departing from the scope of the present disclosure. Moreover, no element or component in the present disclosure is intended to be dedicated to the public regardless of whether the element or component is explicitly recited in the following claims.

What is claimed is:

1. A gesture position correcting method comprising:
    obtaining position information of a gesture performed by a gesture-performing object including:
        displaying a first reference mark and a second reference mark;
        causing the first reference mark and the second reference mark to overlap with each other by a user adjusting a posture; and
        obtaining a first distance between the gesture-performing object and a projection position of the gesture-performing object, and a second distance between a depth camera and the gesture-performing object, the position information including the first distance and the second distance as obtained;
    calculating a position deviation of the gesture according to the position information as obtained; and
    correcting the position information according to the position deviation.

2. The method according to claim 1, wherein calculating the position deviation of the gesture includes:
    calculating the position deviation of the gesture using a function model describing a relation among the position deviation, an angle between the depth camera and a user eye, a distance between the depth camera and the user eye, and preset parameters.

3. The method according to claim 2, further comprising:
    generating the preset parameters by executing a parameter verification program.

4. The method according to claim 3, further comprising:
    obtaining a third distance between the depth camera and an upper end of the first reference mark and a fourth distance between the depth camera and a center of the first reference mark; and
    calculating the distance and the angle between the depth camera and the user eye according to the third distance and the fourth distance.

5. The method according to claim 3, wherein:
    the depth camera is integrated in an augmented reality display device, and
    executing the parameter verification program includes executing the parameter verification program in response to start-up of the augmented reality display device.

6. The method according to claim 2, wherein calculating the position deviation of the gesture using the function model includes:
    calculating a first position deviation of the gesture in a lateral direction of the first reference mark and the second reference mark, and
    calculating a second position deviation of the gesture in a vertical direction of the first reference mark and the second reference mark.

7. The method according to claim 1, further comprising:
    detecting the gesture, including:
        obtaining an image using the depth camera; and
        recognizing the gesture from the image.

8. An augmented reality display device comprising:
    a depth camera, wherein the depth camera is configured to capture a gesture performed by a gesture-performing object; and
    a processor coupled to the depth camera, wherein the processor is configured to:
        obtain position information of the gesture by:
            displaying a first reference mark and a second reference mark;
            causing the first reference mark and the second reference mark to overlap with each other by a user adjusting a posture; and
            obtaining a first distance between the gesture-performing object and a projection position of the gesture-performing object, and a second distance between the depth camera and the gesture-performing object, the position information including the first distance and the second distance as obtained;
        calculate a position deviation of the gesture according to the position information as obtained; and
        correct the position information according to the position deviation.

9. The device according to claim 8, wherein the processor is further configured to:
    calculate the position deviation of the gesture using a function model describing a relation among the position deviation, an angle between the depth camera and a user eye, a distance between the depth camera and the user eye, and preset parameters.

10. The device according to claim 9, wherein the processor is further configured to generate the preset parameters by executing a parameter verification program.

11. The device according to claim 10, wherein the processor is further configured to:
    obtain a third distance between the depth camera and an upper end of the first reference mark and a fourth distance between the depth camera and a center of the first reference mark; and calculate the distance and the angle between the depth camera and the user eye according to the third distance and the fourth distance.

12. The device according to claim 10, wherein the processor is further configured to execute the parameter verification program in response to start-up of the augmented reality display device.

13. The device according to claim 9, wherein the processor is further configured to:
- calculate a first position deviation of the gesture in a lateral direction of the first reference mark and the second reference mark, and
- calculate a second position deviation of the gesture in a vertical direction of the first reference mark and the second reference mark.

14. The device according to claim 8, wherein the processor is further configured to:
- control the depth camera to obtain an image; and
- recognize the gesture from the image.

* * * * *